United States Patent [19]

Crawford et al.

[11] Patent Number: 5,506,149
[45] Date of Patent: Apr. 9, 1996

[54] SPECTROANALYTICAL SYSTEM AND METHOD

[75] Inventors: Richard L. Crawford, Attleborough, Mass.; Arthur E. Tobey, Salem, N.H.

[73] Assignee: Thermo Jarrell Ash Corporation, Franklin, Mass.

[21] Appl. No.: 398,558

[22] Filed: Mar. 3, 1995

[51] Int. Cl.[6] .................... G01J 3/36; G01P 21/62
[52] U.S. Cl. ............ 436/171; 422/82.05; 422/112; 356/316; 356/328
[58] Field of Search .................... 422/82.05, 82.09, 422/112, 113; 436/171; 356/316, 328

[56] References Cited

U.S. PATENT DOCUMENTS

| | | |
|---|---|---|
| 3,796,887 | 3/1974 | Vincent et al. |
| 4,319,843 | 3/1982 | Gornall |
| 4,322,165 | 3/1982 | Ellebracht et al. |
| 4,469,441 | 9/1984 | Bernier et al. .................... 356/316 |
| 4,596,462 | 6/1986 | Helphrey |
| 5,091,649 | 2/1992 | Rantala |
| 5,225,681 | 7/1993 | Falk et al. |
| 5,436,723 | 7/1995 | Kunselman et al. .................... 356/307 |

*Primary Examiner*—Jeffrey R. Snay
*Attorney, Agent, or Firm*—Fish & Richardson

[57] ABSTRACT

A spectroanalytical system includes housing structure with vent structure open to the atmosphere; radiation dispersing apparatus in the housing structure for dispersing radiation into a spectrum for application to sensor apparatus; sample excitation apparatus for exciting sample material to be analyzed to spectroemissive levels for generating a beam of radiation for dispersion by the dispersing structure; a source of gas; structure for flowing gas from the source into the housing structure for exhaust from the housing structure through the vent structure at a flow rate that is less than one percent of the volume of the housing structure per hour; first control structure for maintaining the pressure of the gas in the housing structure at a constant (within about one millibar) pressure independent of atmospheric pressure; and second control structure for maintaining the temperature of the gas within the housing structure constant within about 0.1° F. during system operation.

18 Claims, 2 Drawing Sheets

5,506,149

SPECTROANALYTICAL SYSTEM AND METHOD

BACKGROUND OF THE INVENTION

This invention relates to spectroscopic analysis.

In spectroanalytical systems using emission sources, material to be analyzed is introduced into an analytical region and excited to spectroemissive levels sufficient to emit detectable radiation characteristic of elements in the sample. The resulting emitted radiation typically is dispersed and analyzed spectroscopically to quantitatively determine elemental compositions of sample materials. Typically, the dispersing structure is mounted in an evacuated housing as wavelength shifts accompany changes in the index of refraction of gases, and such index of refraction is proportional to absolute pressure and absolute temperature.

SUMMARY OF THE INVENTION

In accordance with one aspect of the invention, there is provided a spectroanalytical system with housing structure that includes vent structure open to the atmosphere; radiation dispersing apparatus in the housing structure for dispersing radiation into a spectrum for application to sensor apparatus; sample excitation apparatus for exciting sample material to be analyzed to spectroemissive levels for generating a beam of radiation for dispersion by the dispersing structure; a source of gas; structure for flowing gas from the source into the housing structure for exhaust from the housing structure through the vent structure at a flow rate that is less than one percent of the volume of the housing structure per hour; first control structure for maintaining the pressure of the gas in the housing structure at a constant (within about five millibar) pressure independent of atmospheric pressure; and second control structure for maintaining the temperature of the gas within the housing structure constant within about 0.5° F. during system operation.

In accordance with another aspect of the invention, there is provided a spectroanalytical process for use in a system that has housing structure, sample excitation structure, entrance aperture defining structure in the housing structure for passing a beam of radiation from sample material excited to spectroemissive levels by the sample excitation structure, dispersing structure in the housing structure for dispersing radiation in the beam into a spectrum, exit aperture defining structure in the housing structure, detector structure coupled to the exit aperture defining structure, signal processing apparatus coupled to the detector structure for processing the output of the detector structure to provide analysis information on an element of interest in the sample material. The process includes the steps of maintaining a stable temperature within one degree Celsius in the housing structure, and concurrently maintaining a stable absolute pressure of the gas in the housing structure independent of atmospheric pressure while maintaining an open vent to vent gas from the housing structure to atmosphere.

In a particular embodiment, the housing is of sheet metal, has a volume in the range of fifty liters to two hundred liters and is thermally insulated; the absolute pressure sensor structure includes a piezoresistant sensor element; the gas is selected from the group consisting of argon and nitrogen; and the vent structure is adapted to allow a gas flow rate from the housing structure of less than two percent of the volume of the housing structure per minute during processing. The system is of the Paschen-Runge type, the entrance aperture structure has a width of about twenty-five micrometers and a height of about twenty millimeters, exit aperture defining structure defines a plurality of exit apertures; each exit aperture includes a slit having a height of about four millimeters; the entrance and exit apertures and the dispersing structure are disposed on a Rowland circle of at least about 0.5 meter diameter; the dispersing structure is a reflection grating that has at least one thousand lines per millimeter; spectrum shifter apparatus is disposed between the entrance aperture defining structure and the dispersing structure for shifting the beam relative to the dispersing structure to shift the spectrum between a first order maximum and a second order maximum for a particular element; and the sample excitation structure is an induction coupled plasma source disposed along a path coincident with the entrance axis. The controller structure includes error amplifier circuitry that has a first input from the absolute pressure sensor structure and a second input from an absolute pressure reference.

BRIEF DESCRIPTION OF THE DRAWING

Other features and advantages of the invention will be seen as the following description of a particular embodiment progresses, in conjunction with the drawings, in which.

DESCRIPTION OF PARTICULAR EMBODIMENT

Figure 1:
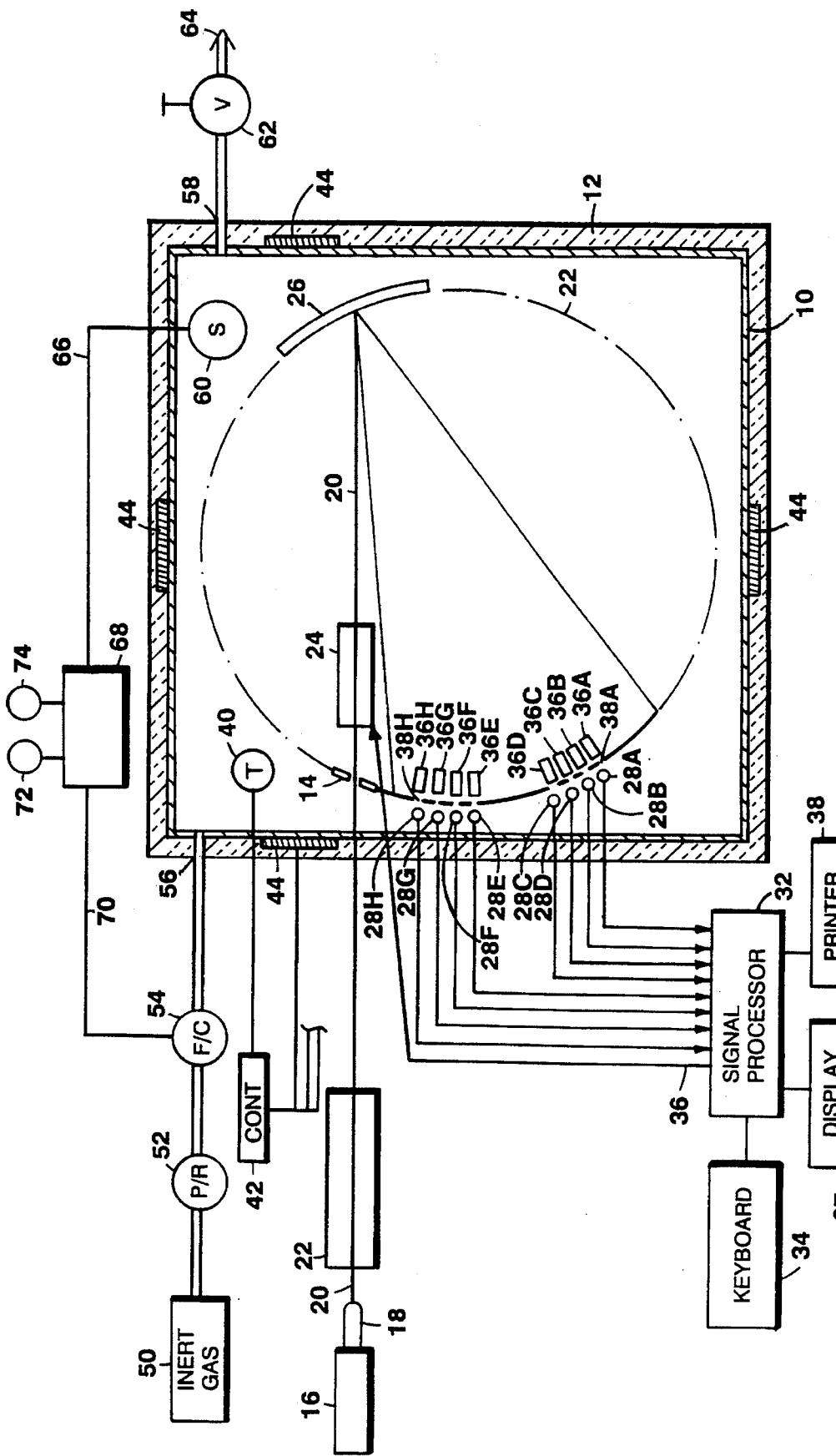
FIG. 1 is a diagram of a spectroanalytical system in accordance with the invention.

With reference to FIG. 1, the spectroanalytical system there illustrated includes rectangular sheet metal housing structure 10 of about one hundred liters volume with surrounding thermal insulation 12. Aligned with entrance slit structure 14 is induction coupled plasma source 16 disposed so that the plasma 18 is "end on" and aligned with beam axis 20. Disposed between source 16 and entrance slit 14 are optical elements diagrammatically indicated at 22. Disposed within housing 10 are spectrum shifter 24, and reflection grating 26 for dispersing radiation on beam axis 20 into a spectrum for sensing by a selected group of photomultiplier tube sensors 28 disposed along Rowland circle 30 that has a radius of curvature of 0.75 meter. Grating 26 is a spherical holographic grating with dimensions of about 60 millimeters by 70 millimeters and 2,400 lines per millimeter. Disposed between grating 26 and each sensor 28 is an exit slit structure 30 which defines a slit of about 25 micrometers with and about 4 millimeters height. Detectors 28 are connected to signal processor 32 which responds to input commands from controller 34 which typically includes a keyboard; produces signals on line 36 to control to spectrum shifter 24; and processes information generated by sensors 28 for application to output devices such as display 37 and printer 38.

Disposed within housing 10 is temperature sensor 40 which generates signals to controller 42 for controlling heater pad units (diagrammatically indicated at 44) of two hundred watts capacity for maintaining the temperature within housing 10 at a constant temperature of 90° F.+/–0.2° F. An inert gas such as argon or nitrogen supplied from source 50 (source pressure being about 25 psig) through pressure regulator 52 and Pneutronics Model VSO flow controller 54 for application to inlet 56 of housing 10. Coupled to housing 10 through control valve 62 is atmospheric vent 64. Disposed in housing 10 is absolute pressure sensor 60—an Omega Model PX142 pressure transducer which includes a solid state piezoresistant silicon sensor chip—that produces an output voltage over line 66 to controller 68 for application over line 70 to flow controller 54. Coupled to controller 68 are low flow indicator 72 and high flow indicator 74.

Figure 2:
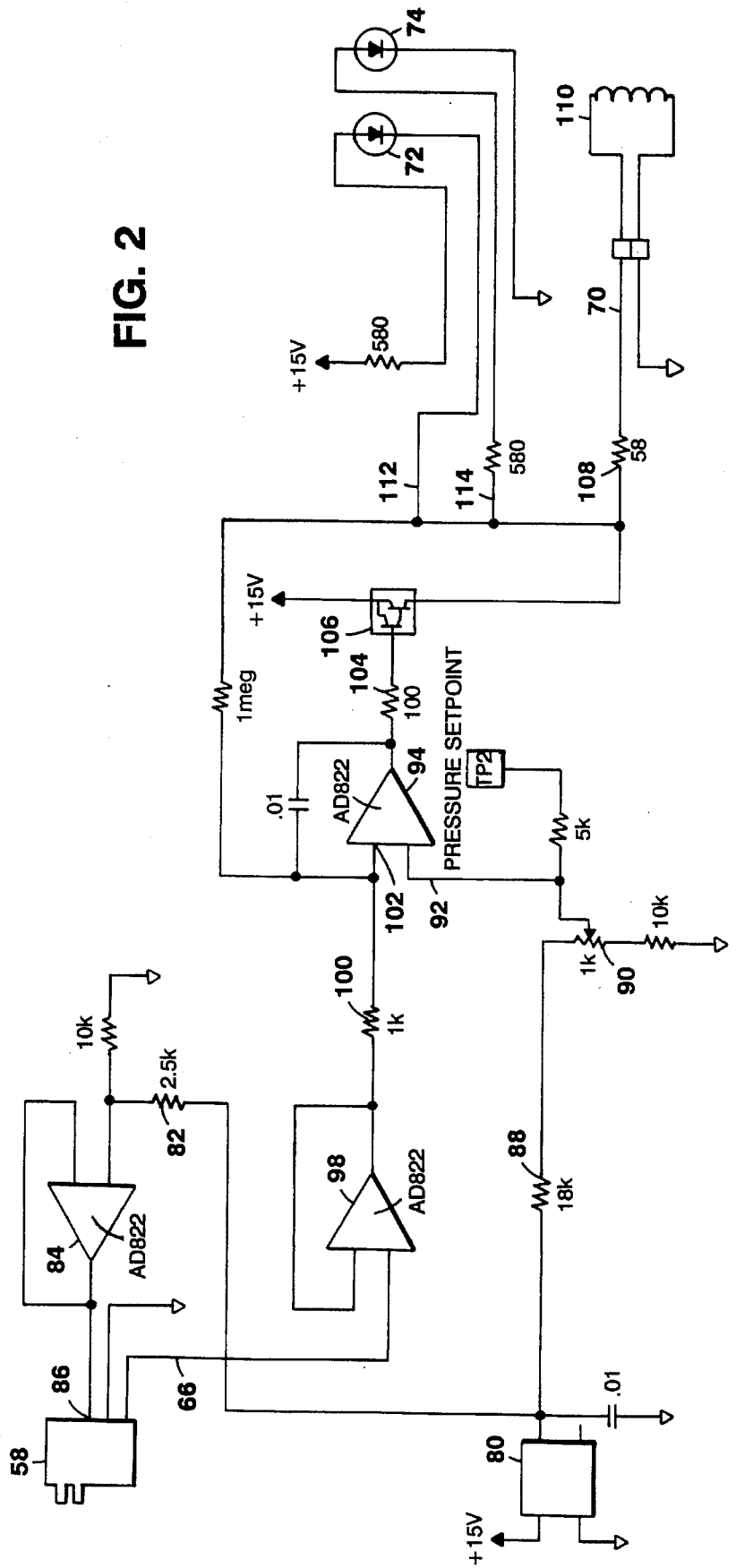
FIG. 2 is a schematic diagram of control circuitry employed in the system shown in FIG. 1.

Further details of controller 68 may be seen with reference to FIG. 2. That circuit includes ten volt reference circuit 80 that is connected through resistor 82 to eight volt power supply circuit 84 whose output is supplied to input 86 of sensor 58; and through resistor 88 to adjustable potentiometer 90 which sets an absolute pressure reference for application over line 92 to error amplifier 94. The output of sensor 58 is applied over line 66 to buffer 98 whose output is applied through resistor 100 to input 102 of error amplifier 94 that has a gain of 1,000. The output of amplifier 94 is applied through resistor 104 to solenoid driver circuit 106 whose output is applied through resistor 108 and line 70 to inductor 110 of flow controller 54; and over lines 112, 114 to low flow and high flow indicators 72 and 74, respectively.

Prior to system operation, housing 10 is flushed at a flow rate of 30–50 liters per minute under the control of control valve 62; and heater pads 44 are energized by control circuit 42 in response to signals from sensor 40 to establish and maintain a temperature in housing 10 of 90°+/−0.2° F. After flushing, valve 62 is throttled to a maximum vent flow rate of about one liter per minute and control is transferred to pressure controller 68 so that gas flows to atmosphere at a rate of up to about one liter per minute (as a function of the difference between the actual pressure in housing 10 and atmospheric pressure) and the pressure in housing 10 is maintained and stabilized at 1050+/−1 millibar independent of atmospheric pressure. Absolute pressure sensor 60 monitors the pressure in housing 10 and applies control signals over line 66 to circuitry 68 for controlling the inductor 110 of flow controller 54. With vent 64 continuously open to atmosphere and housing 10 being essentially continuously purged at a low flow rate (the actual flow rate through vent 64 being a function of the actual atmospheric pressure), sample material to be analyzed is inputed into plasma source 16 and the resulting radiation is passed along beam path 20 through optical unit 22, entrance slit 14 and spectrum shifter 24 for dispersion and sensing by detectors 28 for application to signal processor 32. This system may be of the type shown in copending application Ser. No. 08/027,209, filed Mar. 5, 1993, now U.S. Pat. No. 5,436,723, and entitled Spectroscopic Analysis, the disclosure of which is expressly incorporated herein by reference. The system with compensated thermal and pressure control has analysis characteristics comparable to a vacuum system of the type shown in the above-mentioned application Ser. No. 08/027,209.

While a particular embodiment of the invention has been shown and described, various modifications will be apparent to those skilled in the art, and therefore, it is not intended that the invention be limited to the disclosed embodiment, or to details thereof, and departures may be made therefrom within the spirit and scope of the invention.

What is claimed is:

1. A spectroanalytical system comprising housing structure, sample excitation structure, entrance aperture defining structure in said housing structure for passing a beam of radiation from sample material excited to spectroemissive levels by said sample excitation structure, dispersing structure in said housing structure for dispersing radiation in said beam into a spectrum, exit aperture defining structure in said housing structure, detector structure coupled to said exit aperture defining structure, signal processing apparatus coupled to said detector structure for processing the output of said detector structure to provide analysis information on an element of interest in said sample material, temperature compensation structure including a temperature sensor disposed in said housing structure, and heater structure responsive to said temperature sensor for maintaining a stable temperature within one degree Celsius in said housing structure, and pressure compensation structure for maintaining an absolute pressure independent of atmospheric pressure in said housing structure, said pressure compensation structure including a source of gas coupled to said housing structure, vent structure coupled to said housing structure and open to atmosphere for continuously venting gas from said housing structure, pressure sensor structure coupled to said housing structure for monitoring the pressure of gas in said housing structure, and controller structure responsive to said pressure sensor structure for maintaining a stable gas pressure, within five millibar, of said gas in said housing structure independent of atmospheric pressure.

2. The system of claim 1 wherein said housing is of sheet material.

3. The system of claim 1 wherein said housing is thermally insulated.

4. The system of claim 1 wherein said pressure sensor structure includes a piezoresistant sensor element.

5. The system of claim 1 wherein said gas is selected from the group consisting of argon and nitrogen.

6. The system of claim 1 wherein said housing structure has a volume in the range of fifty liters to two hundred liters and said vent structure is adapted to allow a gas flow rate from said housing structure of less than two percent of the volume of said housing structure per minute.

7. The system of claim 1 wherein said exit aperture defining structure defines a plurality of exit apertures, and said dispersing structure includes a reflection grating.

8. The system of claim 1 wherein said sample excitation structure is an induction coupled plasma source disposed along a path coincident with said entrance axis.

9. The system of claim 1 wherein said system comprises a Paschen-Runge arrangement, said entrance aperture structure has a width of about twenty-five micrometers and a height of about twenty millimeters, and said exit aperture includes a slit having a height of about four millimeters.

10. The system of claim 1 wherein said entrance and exit apertures and said dispersing structure are disposed on a Rowland circle of at least about 0.5 meter diameter.

11. The system of claim 10 wherein said dispersing structure is a reflection grating that has at least one thousand lines per millimeter.

12. The system of claim 11 and further including spectrum shifter apparatus disposed between said entrance aperture defining structure and said dispersing structure.

13. The system of claim 12 wherein said system comprises a Paschen-Runge arrangement, said entrance aperture structure has a width of about twenty-five micrometers and a height of about twenty millimeters, and said exit aperture includes a slit having a height of about four millimeters.

14. The system of claim 13 wherein said controller structure includes error amplifier circuitry that has a first input from said pressure sensor structure and a second input from an absolute pressure reference.

15. The system of claim 1 wherein said housing is of sheet metal and is thermally insulated, said pressure sensor structure includes a piezoresistant sensor element, and said controller structure includes error amplifier circuitry that has a first input from said pressure sensor structure and a second input from an absolute pressure reference.

16. The system of claim 15 wherein said gas is selected from the group consisting of argon and nitrogen; said housing structure has a volume in the range of fifty liters to two hundred liters, and said vent structure is adapted to allow a gas flow rate from said housing structure of less than two percent of the volume of said housing structure per minute.

17. A spectroanalytical process comprising the steps of providing housing structure with vent structure open to atmosphere, generating a beam of radiation from sample material excited to spectroemissive levels, passing said beam into said housing, dispersing radiation in said beam into a spectrum in said housing, sensing radiation in said spectrum corresponding to a particular element of interest in said sample material, processing said sensed radiation to provide a value of said particular element of interest in said sample material, maintaining a stable temperature within one degree Celsius in said housing structure, and maintaining a stable gas pressure, within five millibar, of said gas in said housing structure independent of atmospheric pressure by allowing gas to be continuously and controllably introduced to and vented from said housing structure through said vent structure during said dispersing and processing steps.

18. The process of claim 17 wherein said gas is selected from the group consisting of argon and nitrogen; said housing structure has a volume in the range of fifty liters to two hundred liters, and said vent structure is adapted to allow a gas flow rate from said housing structure of less than two percent of the volume of said housing structure per minute during said pressure maintaining steps.

* * * * *